Sept. 24, 1957

A. G. KANDOIAN 2,807,713

ANTENNA COUPLINGS

Filed Dec. 16, 1942

INVENTOR.
ARMIG G. KANDOIAN
BY
ATTORNEY

United States Patent Office 2,807,713
Patented Sept. 24, 1957

2,807,713

ANTENNA COUPLINGS

Armig G. Kandoian, New York, N. Y., assignor to International Telephone and Telegraph Corporation, a corporation of Maryland Application December 16, 1942, Serial No. 469,174

1 Claim. (Cl. 250—13)

This invention relates to improvements in antenna couplings, and more particularly to arrangements for coupling both a transmitter and receiver to a common antenna.

An object of this invention is to provide improved arrangements for coupling a transmitter and a receiver to a common antenna.

Another object of this invention is to provide improved systems for preventing the high voltages from a transmitter from entering a receiver connected to the same antenna as the transmitter.

A more specific aspect of this invention contemplates the inclusion of a high impedance, electrical half wavelength transformer network between the transmitter-transmission line and the receiver-transmission line connected to a common antenna, with a spark gap connected across the electrical mid-point of the transformer network.

Other objects and advantages of the present invention will become apparent from the following description of a preferred embodiment and modifications of a system in accordance with the present invention, illustrated in the accompanying drawings, in which.

Figure 1:
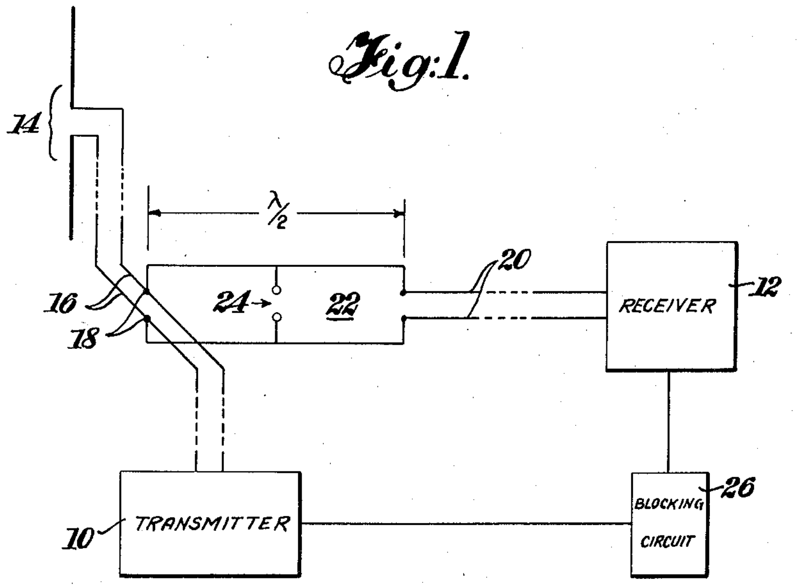
Fig. 1 is a circuit diagram of a preferred form of antenna coupling system in accordance with the present invention.
Figures 2, 2A, 2B, 2C:
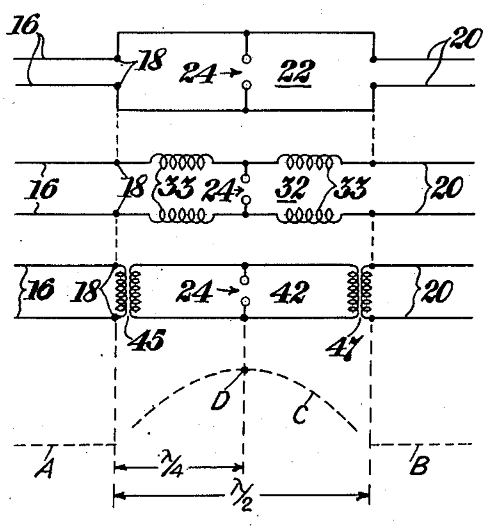
Fig. 2 is a circuit diagram illustrating a detail of the coupling circuit shown in Fig. 1.

Fig. 2*a* is a circuit diagram illustrating a modified coupling unit adapted to be used in the system shown in Fig. 1;

Fig. 2*b* is a circuit diagram of a still further modified coupling arrangement adapted to be used in the circuit shown in Fig. 1; and Fig. 2*c* is a diagram correlated with Figs. 2, 2*a* and 2*b* showing the voltage relationship present in those coupling circuits.

The purpose of the present invention is to permit the use of a common antenna by a transmitter and receiver, while at the same time automatically preventing the high transmitter voltages from being impressed upon the receiver. Fig. 1 illustrates a transmitter 10 and a receiver 12 adapted to be connected to common antenna 14. The transmitter 10 is connected to the antenna 14 by transmission line 16 whose conductors are so spaced that the line will have a relatively low impedance. The receiver is connected to the transmission line 16 and thence to the antenna 14 at suitable junction points 18, through a second transmission line 20 and a high impedance transformer network 22. In the preferred form of invention the impedance of the line 20 matches the impedance of the line 16, while the impedance of the transformer network 22 is substantially higher than the impedance of the two lines.

For high frequency work it is contemplated that the transformer network 22 be a linear transformer in the form of a high impedance line whose length is equal to half the wavelength of the operating frequency of transmitter 10, and across whose mid-point, or at a quarter wavelength, is connected a space discharge device 24. This transformer network is shown by itself in Fig. 2, correlated with Fig. 2*c* in which A represents the flat voltage characteristic of the line 16, B represents the flat voltage characteristic of the line 20 and curve C will represent the voltage characteristic of the half wavelength network or line 22. The space discharge device 24 will, therefore, be connected across the point D of highest voltage.

The advantages of the foregoing system will, it is believed be readily apparent to those skilled in this art. The transformer network 22 in the form of a high impedance line has a transformation ratio of 1:1, so that there will be substantially no loss of received voltage between the antenna 14 and the receiver 12. If, however, the space discharge device 24 is set, for example, to break down at 100 volts, and if the impedance of the network 22 is several times that of the lines 16 and 20 the resultant voltage impressed upon the receiver from the transmitter will be reduced by the ratio between the impedance of the line 20 and the impedance of the network 22. As a practical example, if the impedance of network 22 is 1000 ohms and the impedance of the lines is 140 ohms, while the space discharge device 24 breaks down at 100 volts, the voltage impressed upon the receiver will be 100 volts times the ratio of transmission line to transformer network impedance or 140 ohms:1000 ohms, giving a resultant impressed voltage of 14 volts even though the transmitter voltage may be in the order of 5000 volts. In all cases, however, it is to be noted that the breakdown voltage of the space discharge device 24 is higher than the voltage received upon the antenna from an incoming signal and impressed upon the space discharge device by the transformer network so that reception is not impaired. I have thus provided a system wherein a transmitter and receiver may be connected to a common antenna but, in which the resultant voltage impressed upon the receiver is much less than has been possible with systems heretofore proposed.

It is common in connection with a transmitter and receiver coupled to the same antenna to block the operation of the receiver during the operation of the transmitter. In Fig. 1, I have indicated that such a blocking circuit 26 may be used, if desired.

In the case of medium frequencies where it would be substantially impossible to construct the transformer network 22 of Fig. 1, of the required structural length, I may substitute a network 32, shown in Fig. 2*a*, which network will be the electrical equivalent of a half wavelength line, by the inclusion of a plurality of balanced inductances 33. Again, the space discharge device 24 will be connected across the electrical mid-point of the transformer network 32. Assuming that the transformer network 32 is the electrical equivalent of a half wavelength line, the voltage characteristics illustrated in Fig. 2*c* will still hold true.

At still lower frequencies the transformer network illustrated in Fig. 2*b* may be applicable. In this case, the transformer 45 is a step-up transformer, while the transformer 47 is a step-down transformer having the same ratio as the transformer 45. The transformers themselves, with the addition of suitable serial balanced inductances, if necessary, are preferably designed to again present a half wavelength network between the transmission lines 16 and 20, and, again, the space discharge device 24 is connected across the electrical mid-point of this network or, at the quarter wavelength point. If the transformer network 42 is of an electrical length equivalent to the half wavelength of the transmitter operating frequency, the voltage characteristics illustrated in Fig. 2*c* will also still hold true.

In the circuits illustrated in Figs. 2*a* and 2*b*, it is also contemplated that the impedance of the transformer networks 32, 42 be substantially higher than the impedance of the matched lines 16, 20.

While the space discharge device 24 has been illustrated, by way of example, as a spark gap, it will be clear to those skilled in this art that any other suitable space discharge device can be used; a neon tube is another example of a space discharge device which is to be considered the full equivalent of the spark gap illustrated, although I do not intend to limit the equivalents by the mention of such specific example.

While I have described above the principles of my invention in connection with a specific system and particular modifications thereof, it is to be clearly understood that this description is made only by way of example and not as a limitation on the scope of my invention as set forth in the objects and the accompanying claim.

I claim:

In combination, a transmitter, a receiver, a common antenna for said transmitter and receiver, a first transmission line leading from said transmitter to said antenna, a second transmission line leading from said receiver, an impedance transformer network interconnecting said second transmission line with said first transmission line, said transformer network comprising a two-conductor line, each conductor consisting of two balanced lumped inductances in series arranged symmetrically, the ends of said conductors being connected respectively to said first transmission line and said second transmission line providing a high impedance and being of such value that the electrical length of said line is equal to a half wavelength of the operating transmitter frequency, and a space discharge device connected between said conductors intermediate said lumped inductances at the electrical center of said line at the quarter wavelength point.

References Cited in the file of this patent

UNITED STATES PATENTS 2,688,746 Young ................ Sept. 7, 1954